(12) United States Patent
Patterson

(10) Patent No.: US 6,488,504 B1
(45) Date of Patent: Dec. 3, 2002

(54) HELICOPTER FLIGHT TRAINING VEHICLE

(76) Inventor: Scott D. Patterson, 954 Crellin Rd., Pleasanton, CA (US) 94566

( * ) Notice: Subject to any disclaimer, the term of this patent is extended or adjusted under 35 U.S.C. 154(b) by 234 days.

(21) Appl. No.: 09/689,329

(22) Filed: Oct. 12, 2000

Related U.S. Application Data

(60) Provisional application No. 60/159,164, filed on Oct. 13, 1999.

(51) Int. Cl.$^7$ .............................. G09B 19/16; G09B 9/02
(52) U.S. Cl. ....................................... 434/33; 244/17.11
(58) Field of Search ........................ 434/29, 30, 33–35, 434/37, 38, 45, 46, 55, 58, 59, 66, 67; 446/36, 230, 450; 703/8; 472/130; 180/234–237, 245, 315, 321; 244/17.11, 17.17

(56) References Cited

U.S. PATENT DOCUMENTS

| | | | |
|---|---|---|---|
| 1,272,766 A | * 7/1918 | Bongartz | 434/37 |
| 2,216,489 A | * 10/1940 | Fox | 244/103 R |
| 2,427,936 A | * 9/1947 | Wales, Jr. | 244/2 |
| 2,717,549 A | * 9/1955 | Holcombe | 101/132 |
| 2,954,614 A | * 10/1960 | Vogt | 244/17.23 |
| 3,246,403 A | * 4/1966 | Vaughen | 434/33 |
| 3,612,441 A | * 10/1971 | Abramopaulos | 244/17.11 |
| 3,818,613 A | * 6/1974 | Julian et al. | 434/33 |
| 5,186,270 A | * 2/1993 | West | 180/202 |
| 5,719,762 A | * 2/1998 | Kanayama | 180/248 |
| 6,129,306 A | * 10/2000 | Pham | 244/2 |
| 6,210,164 B1 | * 4/2001 | Otto | 434/29 |

OTHER PUBLICATIONS

The book "Rotor & Wing International" Helicopter Aerodynamics, by author R. W. Prouty, Copyright 1985 by PJS Publications Inc.

* cited by examiner

*Primary Examiner*—Joe H. Cheng
*Assistant Examiner*—Steven Ashburn

(57) ABSTRACT

A non-flying land based training or testing vehicle with helicopter style main controls and capable of transporting at least one human operator. A preferred embodiment includes a chassis; ground contacting wheels supporting the chassis; a power-plant for driving a wheel and propelling the vehicle; at least one seat for the operator. The controls simulating helicopter controls are within reach of the operator and operatively connected with a computer and electric/hydraulic mechanisms (for example only) to provide similar effects as helicopter controls when manipulated. Such controls include a hand manipulable cyclic (joystick) providing an X-axis output for steering vehicle heading and a Y-axis output for determining forward or reverse travel; a lever style hand operated collective applying various loads to the power-plant to simulate changes in main-rotor blade pitch; and a grip for power-plant RPM manual manipulation by the operator for learning or practicing the maintenance of RPM under changing loads associated with various positions of the collective. Also included is a pair of foot pedals for making the rear wheels steer more than or less than the front wheels in a four wheel steering embodiment, and for simulating tail-rotor blade pitch or anti-torque control of a helicopter.

12 Claims, 8 Drawing Sheets

HELICOPTER FLIGHT TRAINING VEHICLE

CROSS-REFERENCE TO RELATED APPLICATION(S)

A claim is hereby made for this application to the benefits of the earlier filing of my U.S. Provisional Application for patent, Ser. No. 60/159,164 filed Oct. 13, 1999.

BACKGROUND OF THE INVENTION

1. Field of the Invention

The present invention relates to helicopter flight training, and more particularly to a non-flying vehicle capable of traveling on land and which includes helicopter style main controls for manipulation by a human operator.

2. Brief Description of the Related Prior Art

Clearly, in the prior art, there are many types of land vehicles capable of transporting at least the human operator.

Flying helicopters for transporting one or more humans exist in the prior art and include controls somewhat similar to those used in the present invention.

In the prior art there are helicopter flight simulators of numerous various arrangements, often computer aided and used with displays and costly motion platforms, for allowing flying practice and testing. Such simulators are not vehicles which transport the operator along the ground a substantial distance. There are also small flying helicopter models in the prior art which are remotely controlled.

The "prior art" book "ROTOR & WING INTERNATIONAL" HELICOPTER AERODYNAMICS, by R. W. Prouty, Copyright 1985 by PJS Publications Inc. is hereim incorporated by reference in order to provide additional data related to helicopters and to expand the herein data related to the present invention. In the "Prouty" book, the descriptions of the cyclic; the foot pedals; the collective; the throttle, i.e. the main controls manipulated by the pilot, and the requirement of the maintenance of proper engine RPM (revolutions per minute) are of particular relevance to the present invention.

Helicopter piloting is generally referred to as one of the most difficult and dangerous skills to learn. The complex, interactive nature of the controls makes it difficult to learn and impossible to master without extensive hours of demanding practice.

The four basic fundamental skill levels of helicopter flight are:

Stage 1—Learning control functions and basic coordination;

Stage 2—Learning dynamic flight control (compensating for external forces, wind etc.);

Stage 3—Environmental interaction (multi-craft maneuvers and formations);

Stage 4—In-flight communication (passengers, co-pilot, other vehicles, tower etc.).

More than other piloted vehicles, helicopter flight control is complex with proficiency achieved only through concentrated training and repetition. Unfortunately, due to the high cost of helicopter flight time/instruction and limited access to costly motion platform simulators, proficiency training is often compromised.

Furthermore, traditional helicopter flight instruction complicates the learning process by forcing the student pilot to learn multiple, fundamental skills simultaneously that can be learned more effectively if studied and practiced in a graduated series, i.e. one skill level or stage at a time.

The United States Federal Aviation Administration Office of Chief Scientific and Technical Advisor for Human Factors reports (Order 9550.8 Human Factors Policy) "The human factor" has been widely recognized as critical to aviation safety and effectiveness. In the report titled "Safe Skies for Tomorrow," the Office of Technology Assessment (OTA) concluded that long-term improvements in aviation safety will come primarily from human factors solutions. Further the FAA's emphasizing new and coordinated efforts in the area of human factors with NASA, DOD (Department of Defense), and a multitude of professional groups including the Air Transport Association Human Factors Task Force. Their objective is to identify cost-sensitive solutions to achieve performance enhancements including increased personnel efficiency and effectiveness, reduced operations and maintenance cost and enhanced aviation safety.

I am not aware of any prior art land based wheeled vehicle having helicopter style main controls, as with the present invention, for manipulation by a human operator riding in the vehicle. Further, I believe such a vehicle would be of substantial value in learning and practicing helicopter piloting.

SUMMARY OF THE INVENTION

The present invention is a non-flying land based wheeled vehicle with helicopter style main controls and capable of transporting at least one person. The helicopter style controls are provided on the present vehicle within reach of the operator and are positioned, structured and connected to provide similar feel and effects as helicopter controls when manipulated. The vehicle can be used for training a student to fly a helicopter; for a helicopter operator (pilot) to use in order to stay in practice or for testing proficiency, for example only.

The present vehicle in preferred embodiment includes, in addition to the helicopter style main controls, a frame or chassis; four ground contacting wheels supporting the chassis; a power-plant, i.e. engine or motor and transmission or the like supported on the chassis and connected for propelling the vehicle via rotating one or more of the wheels, and at least one seat for supporting a human. One preferred embodiment includes a seat for the student and a seat or seat space for an instructor or test giver (second person) so that at least two can ride in the traveling vehicle. This multiple person vehicle can, as shown in the herewith drawings, includes dual or duplicate helicopter styles controls allowing each person control input.

The controls simulating helicopter controls are provided on the present vehicle within reach of the seated operator and connected directly or indirectly (operatively) to the wheels, transmission, engine (power-plant) throttle and in a preferred embodiment to a computer or programable controller to provide similar effects as helicopter controls when manipulated.

Such helicopter style controls include a cyclic which is a joystick for simulating helicopter heading or direction of travel control which in the present preferred vehicle aims or steers the front wheels (preferably all wheels) and shifts the transmission between forward and reverse. Neutral can be in the center. The joystick (cyclic) on the present invention simulates the cyclic of a flying helicopter. Further included in the present preferred vehicle as a helicopter style control is a pair of foot operated pedals (foot pedals) for simulating helicopter anti-torque manipulation which can be increased or decreased via depression of the proper pedal to rotate the helicopter changing the nose heading, an aspect simulating tail-rotor blade pitch angle change in helicopters having a tail-rotor, or the air stream output angle in the Notar style helicopters, i.e., the type not having a conventional tail-rotor but instead blowing a stream of air to counter the torque effect of the rotating main rotor. In the present preferred vehicle, the opposing foot pedals selectively, depending upon the pedal pushed and the current position of the rear wheels, steer the rear wheels to positions of more than or less than the angles set by the cyclic and can be used as control interfaces to alter the nose or vehicle front end heading if the vehicle is traveling. The cyclic and the foot pedals can be viewed as first and second steering controls on the present vehicle. Also included in a preferred present vehicle is a pivotal collective lever or arm, as a helicopter style control, arranged to apply load or simulated load to the power-plant when raised, much like the collective of helicopter used to change the main rotor blade pitch angle to achieve lift, which due to the greater pitch, applies additional load to the engine (power-plant) requiring additional throttle in order to maintain RPM. In the present preferred vehicle, a hand throttle manipulable by the human operator is also provided preferably in a rotatable grip form, as a helicopter style control, so that the operator can practice maintaining engine RPM simultaneously while manipulating the collective which would also be manipulating power-plant RPM (first and second RPM manipulators). Some, but certainly not all flying helicopters have automatic RPM compensation for collective movement and thus do not include a hand manipulable throttle member, and while such would be within the scope of the invention, I prefer the hand input throttle or second throttle manipulation member so that the operator can practice the simultaneously manipulations of the collective and hand throttle, thereby learning to maintain RPM under varying loads applied to the engine (power-plant). Preferably the collective also actuates a wheel brake when pressed downward beyond a certain predetermined point so as to serve as a hand brake lever for stopping or slowing the vehicle by braking one or more of the wheels. Braking can also be used to simulate additional load applied to the power-plant requiring manual throttle input (increase) to maintain RPM.

The controls simulating helicopter controls are provided on the present vehicle within reach of the seated operator and connected directly or indirectly (operatively) as needed with mechanical, electromechanical, electronics, hydraulics, pneumatics and the like to achieve the desired end result to the wheels, transmission, engine (power-plant) and in a preferred embodiment to a computer or programable controller to provide similar feels and effects as helicopter controls when manipulated.

A primary object of the invention is to provide a land vehicle capable of transporting an operator over terrain and which includes helicopter style main controls useful to reduce the helicopter flight control training process down to its fundamental elements for providing an understanding of helicopter behavior, without risk, and facilitating efficient development of flight control skills at a relatively low cost.

The present helicopter flight training vehicle uniquely provides the appropriate challenge for student pilots at various learning stages or levels, facilitating an extremely effective self paced learning process. By reducing the training process down to additive fundamental skill development, students at all skill levels can practice and improve their proficiency and achieve the required level of instinctual response. Most importantly however, the present vehicle allows the inexperienced student pilot to safely reach a minimum proficiency level without leaving the ground.

Additionally, the present helicopter flight training vehicle can be used for pilot skill testing and early identification of coordination challenges.

Further objects, advantages, uses and structural arrangements of the present invention should become apparent with continued reading and with a review of the included drawings.

Figure 1:
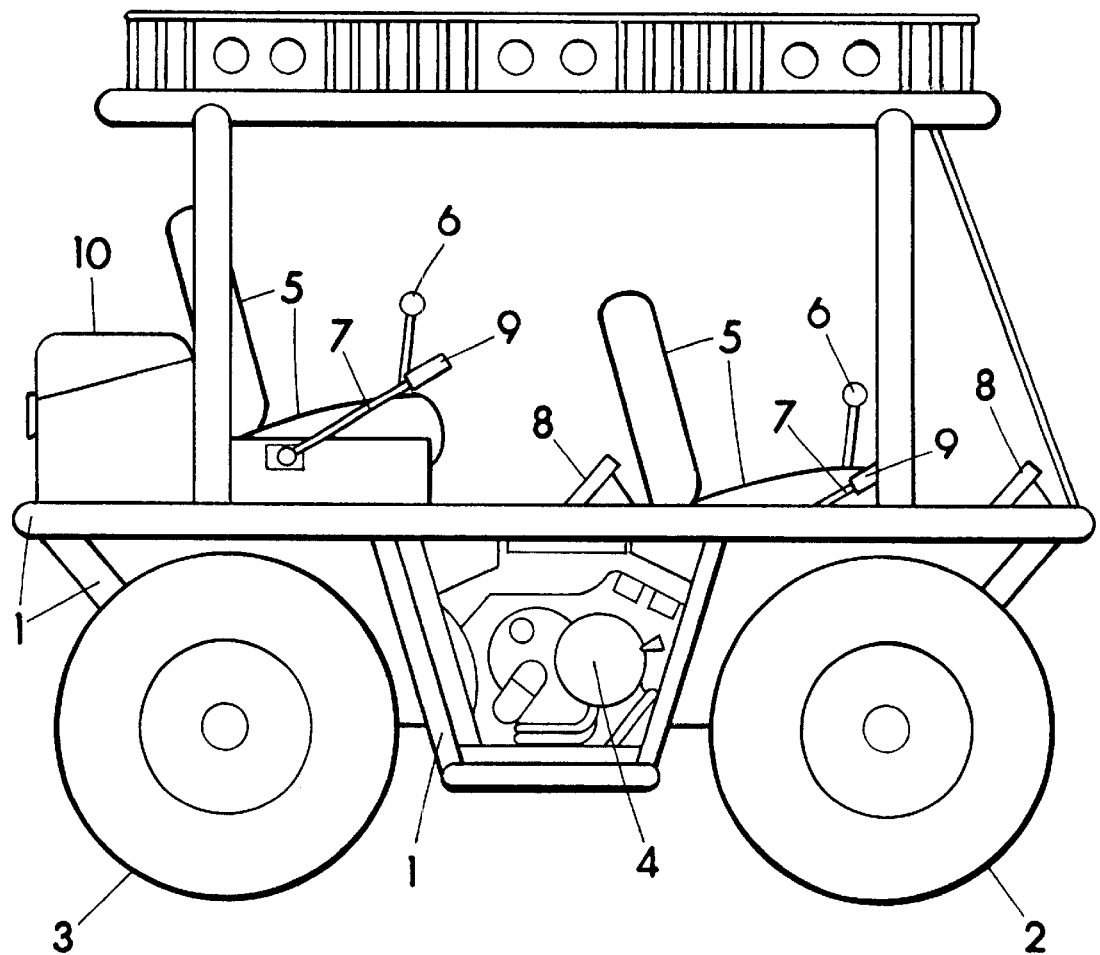
FIG. 1 is a side view illustration of a vehicle in accordance with the invention and arranged with two seats and dual helicopter style controls. A single seat and single set of controls is well within the scope of the invention as is an arrangement of more the two riders.

A frame is shown in FIGS. 2–8 and is useful as a reference to see the angle of the turned wheels, and in FIGS. 1–8 the nose or front end of the vehicle is nearest the right edge of the drawing.

Figure 3:
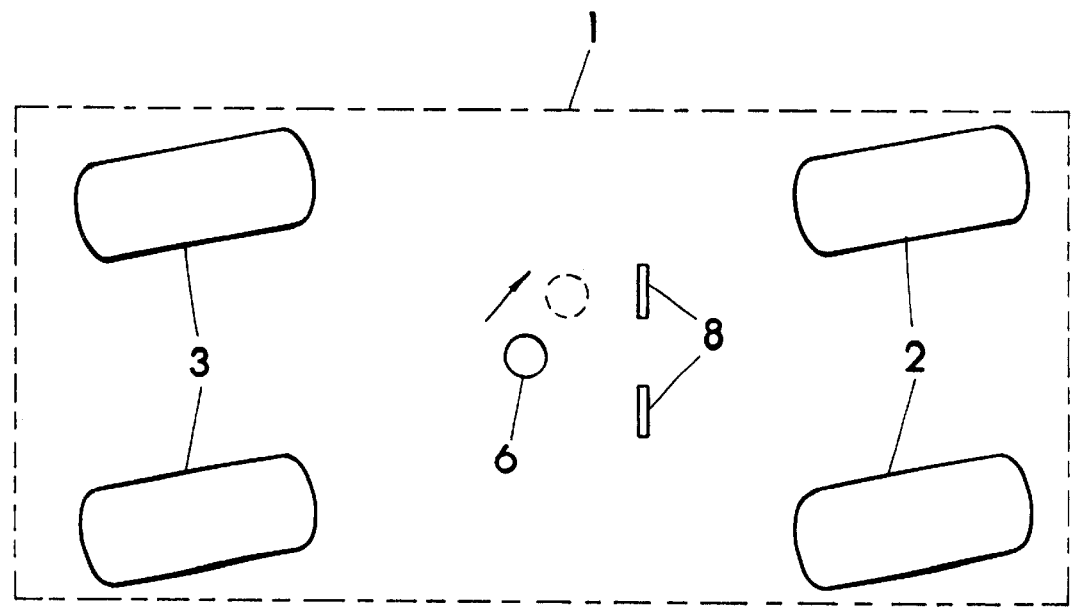

FIG. 3 is a top view, in simplified form, of a portion of the vehicle according to the invention showing the joystick (cyclic) in solid lines at rest and in broken lines moved forward and to the left to have turned all four shown wheels to the left.

Figure 4:
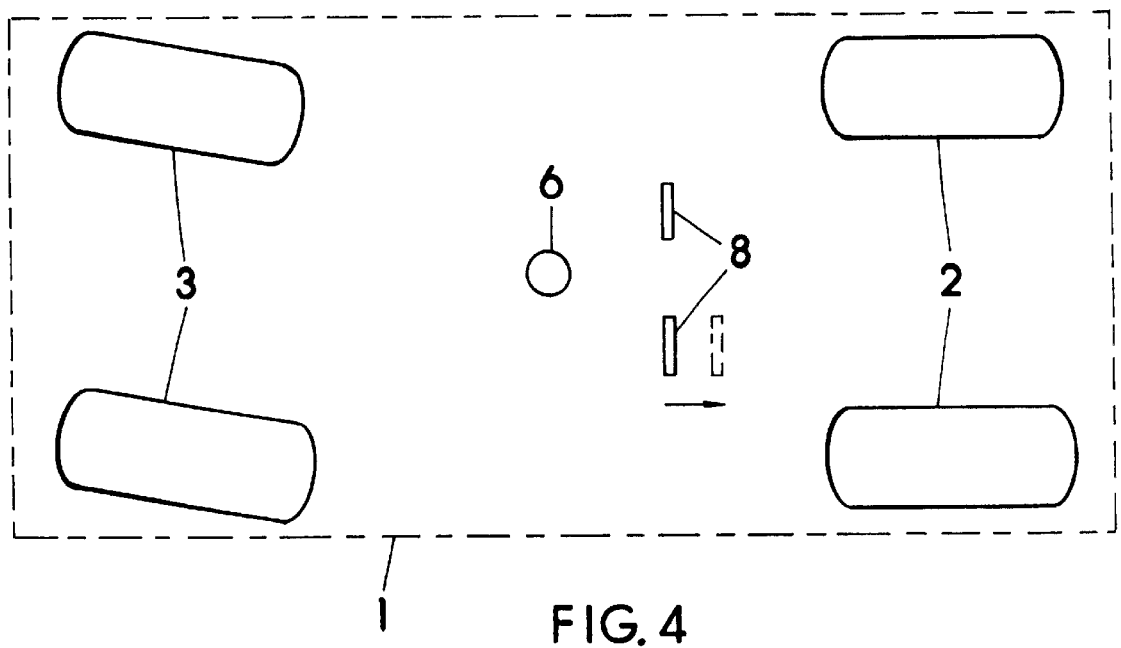

FIG. 4 is a top view, in simplified form, of a portion of the vehicle according to the invention showing the cyclic (joystick) at rest in a center null or neutral position. Also shown are the two foot pedals in solid lines in front of the cyclic. The right foot pedal is illustrated in broken lines as depressed, and the resultant effect is shown as the back or rear wheels steeply turned to the right which if the vehicle were moving would turn the nose or front end to the left. The front wheels are shown aiming straight forward due to the centered or null position of the joystick.

Figure 5:
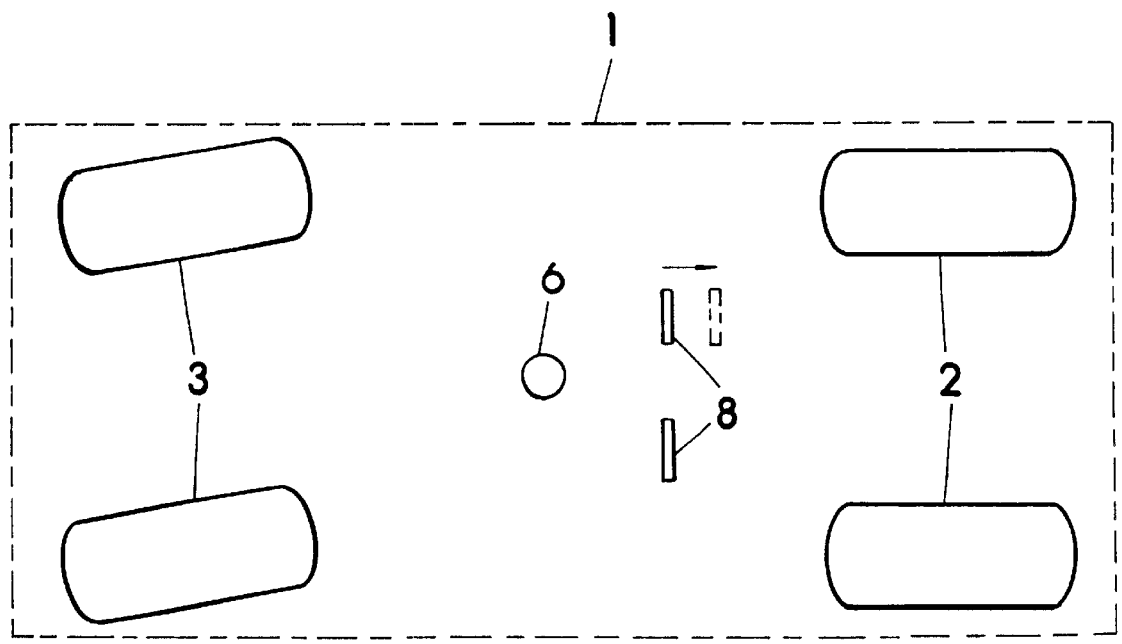

FIG. 5 shows basically the same as FIG. 4 but with the left pedal depressed and the rear wheels turned left which would turn the nose of the moving vehicle to the right.

Figure 6:
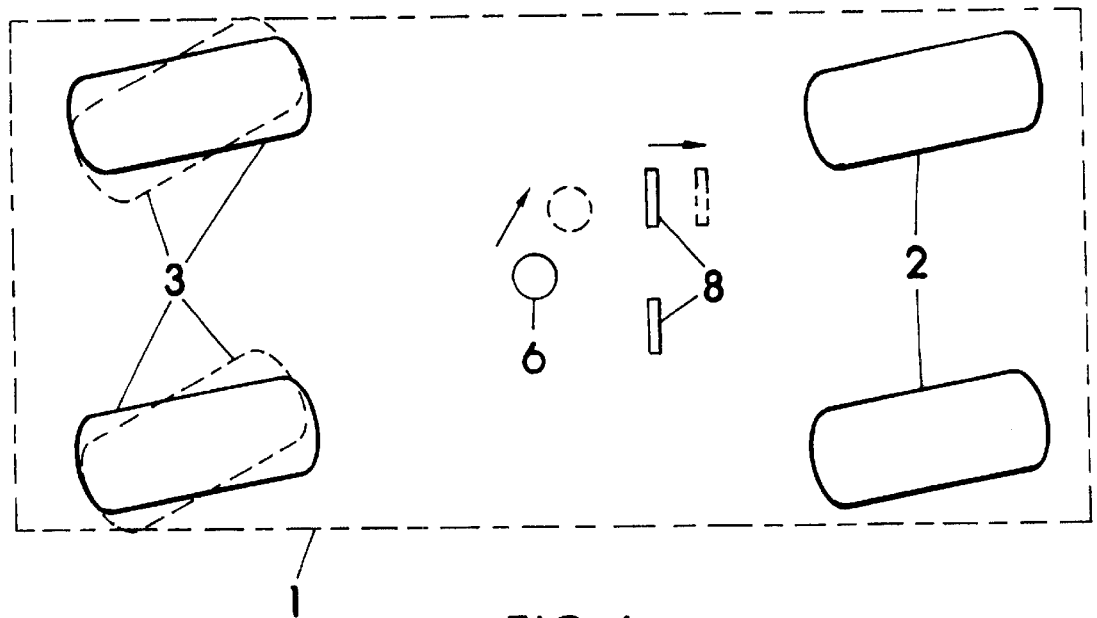

FIG. 6 illustrates the left pedal when depressed turning the rear wheels to the left more than the wheels were turned to the left by the cyclic or joystick. The cyclic or joystick is shown moved forward and to the left of center which turned all four wheels to the left. The left foot pedal is shown in broken lines depressed, which turned the rear wheels further or more to the left.

Figure 7:
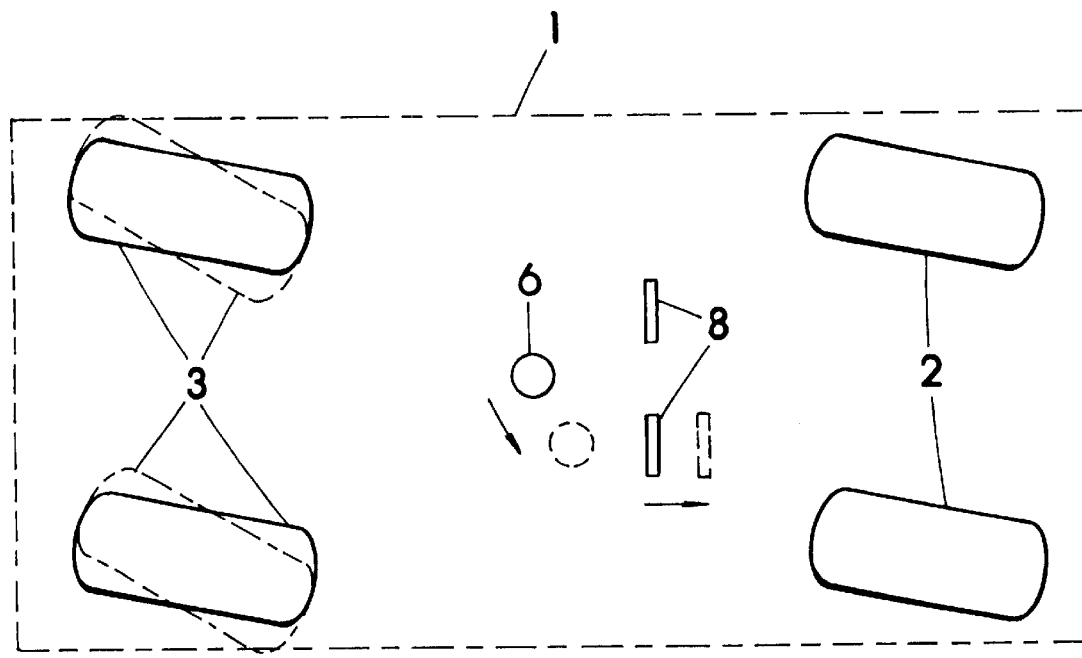

FIG. 7 illustrates the right pedal when depressed turning the rear wheels to the right more than the wheels were turned to the right by cyclic or joystick. The cyclic or joystick is shown moved forward and to the right of center which turned all four wheels to the right. The right foot pedal is shown in broken lines depressed, which turned the rear wheels further or more to the right.

Figure 8:
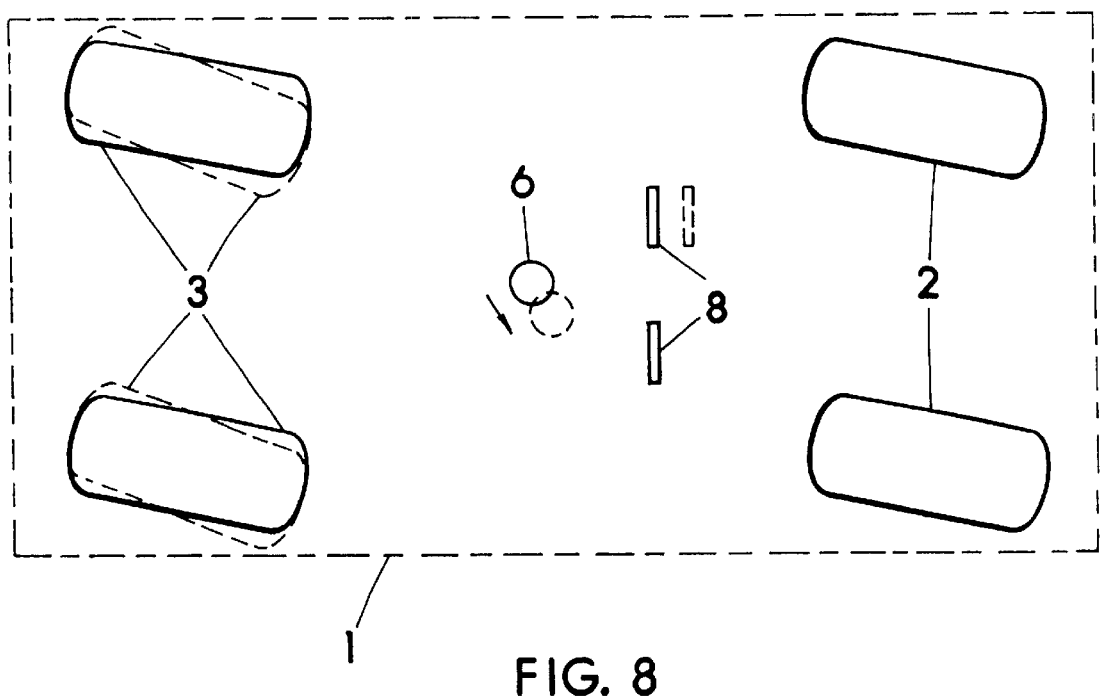

FIG. 8 illustrates the left pedal when depressed turning the rear wheels to the left when the cyclic (joystick) is moved forward to the right, a situation wherein the foot pedals subtract (lessen) the turning amount requested by the joystick, a situation which also allows the reverse, although not shown, wherein the joystick could be moved forward to the left of center and only the right foot pedal would be depressed to have the right pedal in essence request and cause the rear wheels turn back somewhat.

Figure 9:
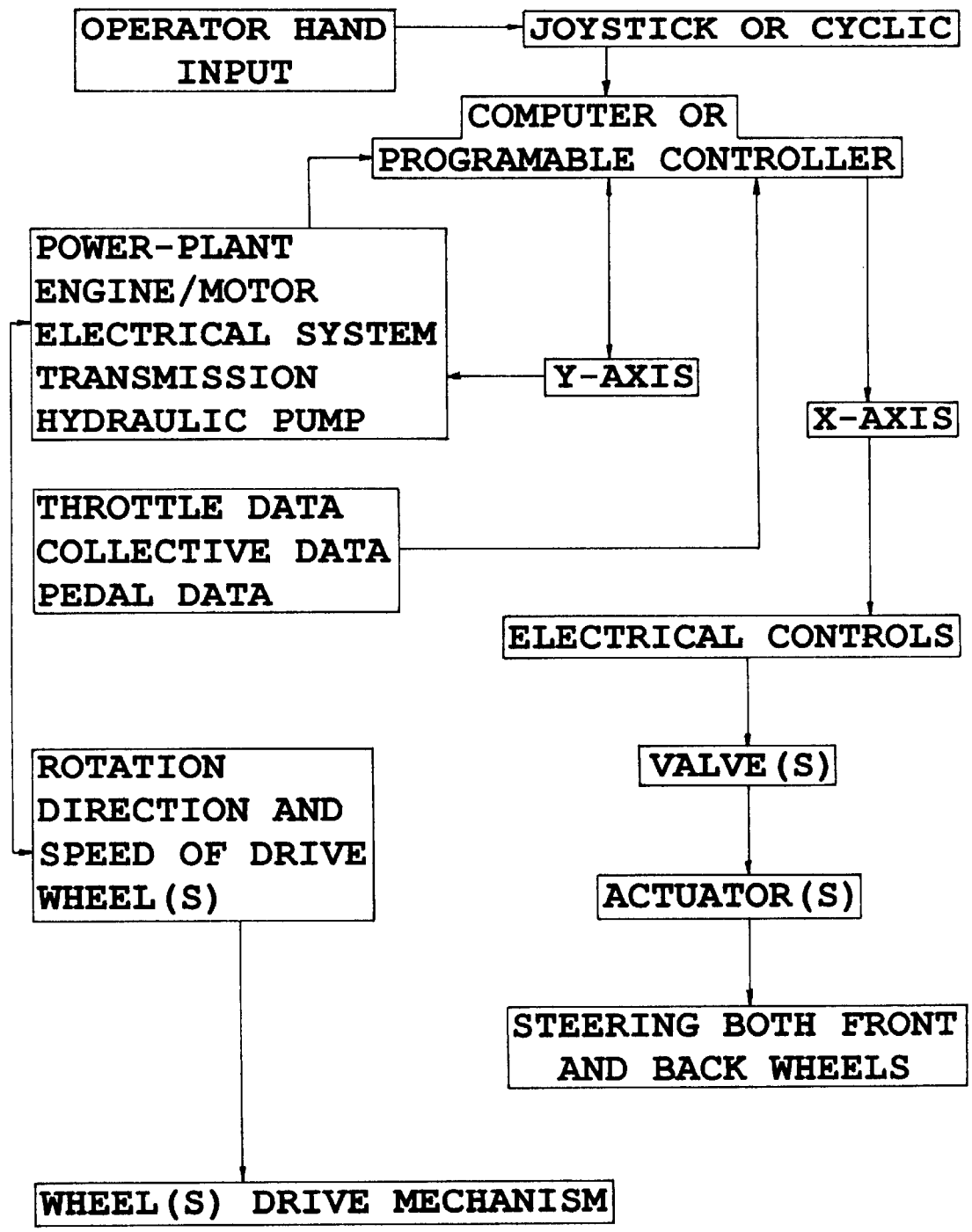

FIG. 9 illustrates for example, using boxes and associating lines, components and associations between the components mainly related to the joystick or cyclic on a vehicle in accordance with the present invention.

Figure 10:
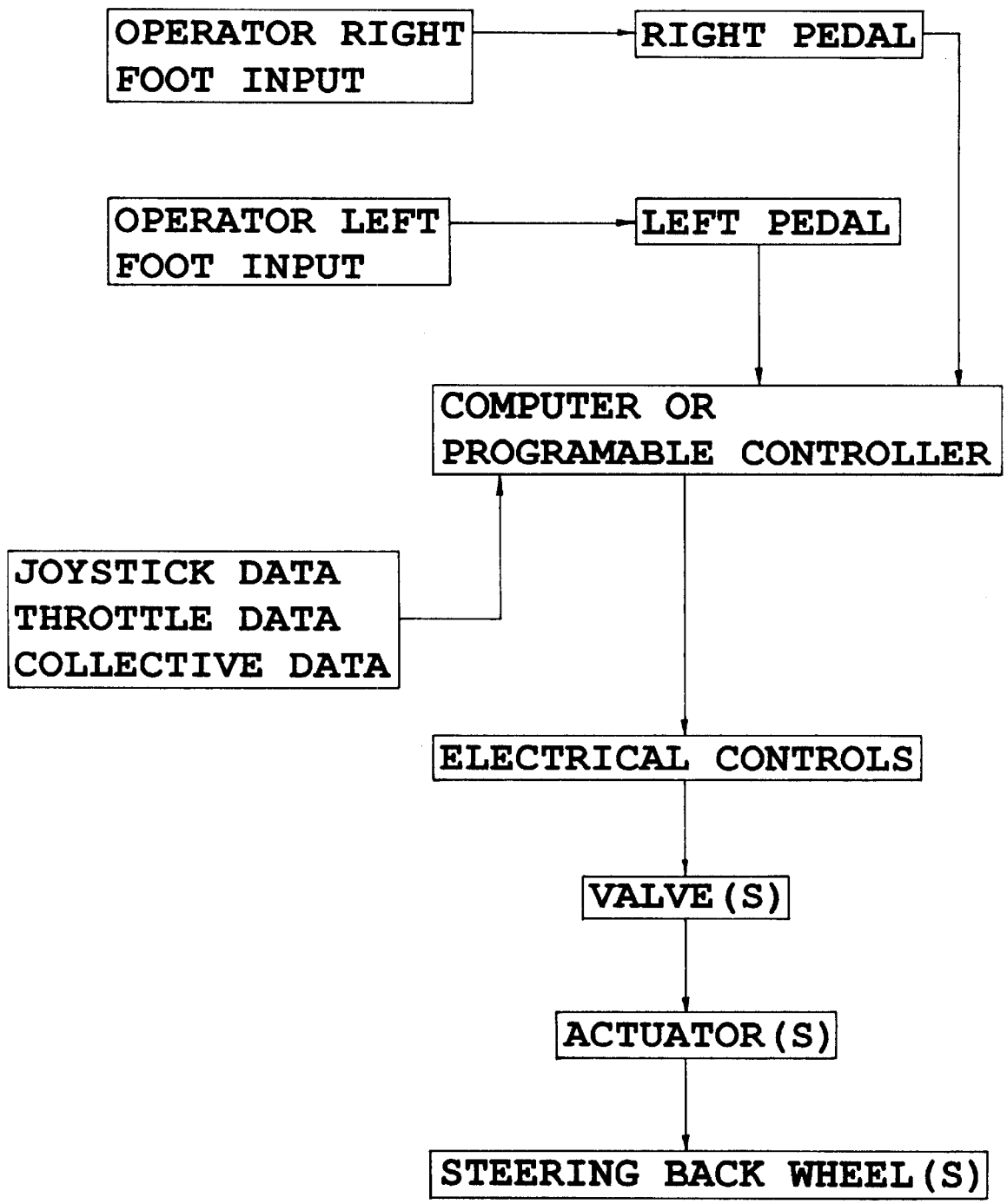

FIG. 10 illustrates for example, using boxes and associating lines, components and associations between the components mainly related to the right and left foot pedals on a vehicle in accordance with the present invention.

Figure 11:
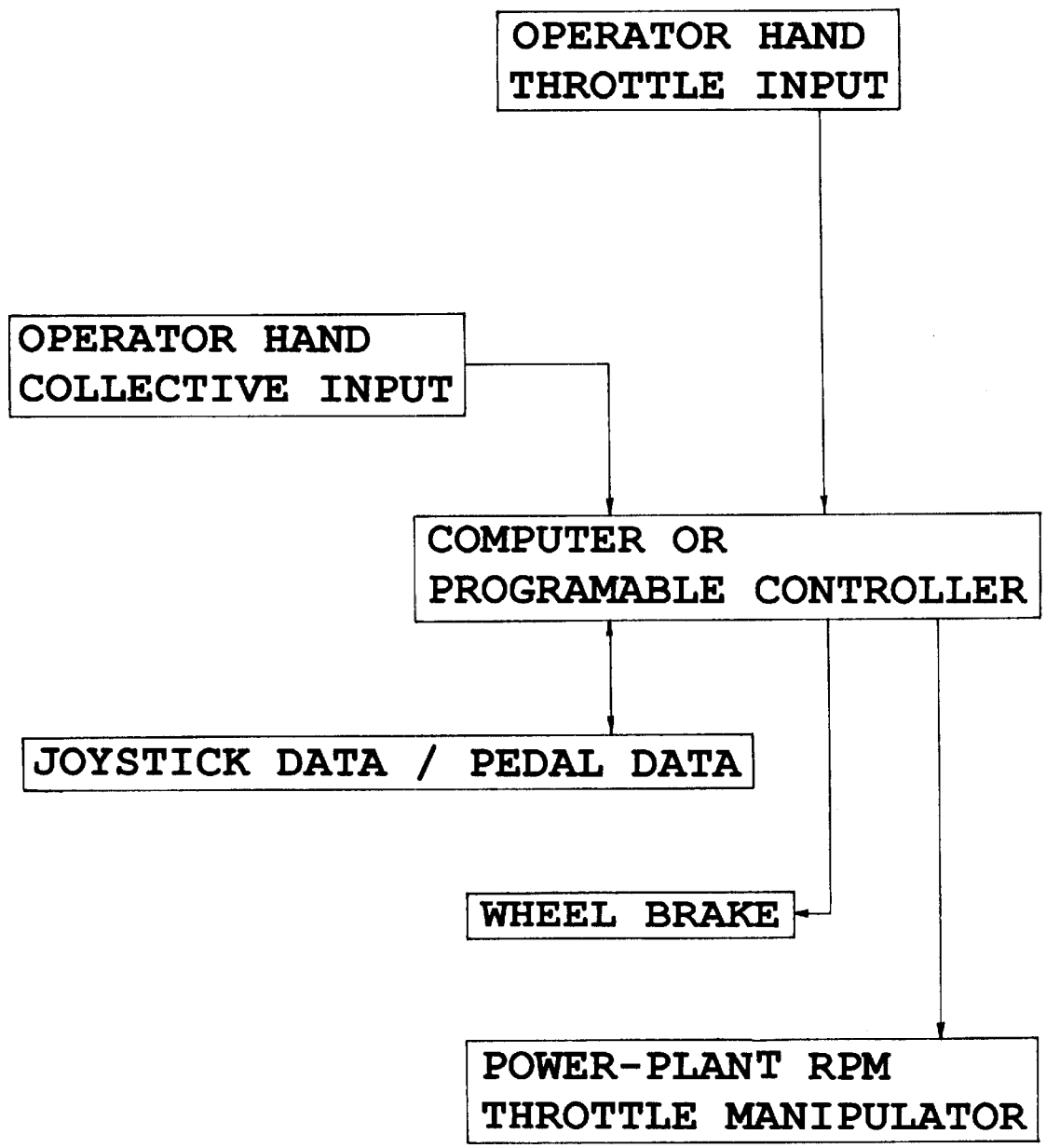

FIG. 11 illustrates for example, using boxes and associating lines, components and associations between the components mainly related to the collective and throttle inputs on a vehicle in accordance with the present invention.

BEST MODES FOR CARRYING OUT THE INVENTION

In furtherance of the details provided in the "Summary of the Invention" and "Brief Description of the Drawings", the present invention can assume various structural arrangements within the scope of the invention. A flying helicopter has three main controls, the cyclic, collective and pedals. The "cyclic" (center joystick) controls the pitch (angle) of the main rotor for direction of travel of the helicopter. The "collective" controls the main rotor RPM via the throttle and the pitch of the main rotor blades for speed and lift of the helicopter. The pedals control the pitch of the tail rotor blades or air stream output direction on a NOTAR helicopter, producing thrust or "anti-torque" to counter the main rotor torque for nose direction. The present invention being a vehicle capable of traveling across land also has the same three main controls or at least controls which simulate the three main controls of a flying helicopter and can be used in helicopter flight skill development and or testing.

A two seat wheeled vehicle having dual helicopter style controls is shown in FIG. 1, while FIGS. 2–11 can be viewed as the same vehicle according to the invention but with the helicopter styles controls not shown duplicated for simplicity. FIGS. 2–11 are considered illustrative of features on the FIG. 1 vehicle two seater with dual controls and also of a single seater with one set of operator to machine interfaces, i.e., controls. The two seater could be use one bench style seat as the support structure for the human riders and does not have to assume the first seat in front of the second seat arrangement illustrated in FIG. 1. The cockpit, i.e., the area where the human(s) rides and accesses the controls, can have an unspecified number of seats, and not all seats need to have access to controls. The embodiment of FIG. 1 is a two seat in-line configuration with student forward/instructor aft.

While the embodiments shown as illustrative of a vehicle in accordance with the invention are shown for example and including circular wheels 2, 3 as the rotatable members for contacting the ground and supporting the chassis 1, the use of tracks (track layer, full track or half-track with wheels) would not be outside of the scope of the invention. Additionally, while four wheels, two back wheels 3 and two front wheels 2, are said to be preferred in an embodiment according to the invention, this is not meant to exclude a three wheeled or tricycle style vehicle which could be arranged with two wheels in the front (at the vehicle nose) and one wheel in the back end of the vehicle, or with only one wheel in the front at the vehicle nose and two wheels at the vehicle back end. For reasons of safety, stability and traction to name just a few reasons, I preferred four wheels mounted to support the frame/chassis 1, but do not want the invention restricted to such.

A preferred embodiment described herein is a four wheel vehicle with all wheel drive and all wheel steering with a tubular uni-body space frame chassis 1 made of suitable material such as metal tubing or sheet metal for example only. The space frame chassis 1 supports and protects the under carriage (including the drive-train and suspension components) and the cockpit (including the student and instructor positions).

The power-plant 4, mounted to the frame 1 and supported thereby, can be any suitable electric or internal combustion motor (or any other suitable powering system), which depending on the particulars selected, includes a transmission compatible with the engine and work load requirements. A transmission is not always needed, as the extensive use of hydraulics eliminates the need for a "typical" transmission. A preferred embodiment can utilize a 2 or 4 cycle engine with an integral automatic (or manual) transmission, although I do not want the invention restricted to such. The power-plant 4 with transmission as shown in FIG. 1 is preferably located low in the center of the vehicle for improved handling. To achieve the preferred all wheel steering and all wheel drive, both front and rear wheel mount and drive assemblies can utilize any drive shaft, differential, suspension, steering, and braking assembly structuring meeting the herein specified end result. Front and rear drive shafts for power distribution can be coupled to and associated with the engine and transmission output to feed power from the power-plant/transmission to front and rear differential/axle assemblies providing all or four wheel drive. The wheels-to-drive shaft connection can include interfacing constant velocity joints (CVs) and with the wheels independently suspended from the chassis much like many modern passenger cars and SUVs for example only. Hydraulic wheel drive motors can be used to eliminate the need for the drive shafts and transaxles and a typical transmission as previously mentioned.

The control and wheel powering and steering systems utilized with a preferred embodiment of the invention can be hydraulic, pneumatic, vacuum, electric, electro-mechanic, mechanical and combinations thereof with or without programmable/computer control technology mounted on the vehicle. Push and pull hand actuated cables could in theory be used to achieve steering and throttle control in a very simple form of the vehicle in accordance with the present invention. I prefer however, to utilize a programmable controller or computer 10 mounted on the vehicle and connecting by electrical wiring to electrical potentiometers on the cyclic 6, foot pedals 8, collective 7 (collective arm or lever) and hand throttle 9. The potentiometers feed or provide data in the form a particular resistance which is varied with movement of the control (cyclic or foot pedal or collective or throttle member), wherein the particular resistance is treated as a particular position of the particular control member. The programmable controller or computer 10 would then process the data and actuate solenoids and other switching/controlling devices as needed to actuate hydraulic valves or the like which in turn actuate powering equipment to, for example, shift the transmission or hydraulic valve into forward or reverse depending on whether the cyclic 6 was forward or rearward of the center null to drive the wheels 2, 3 forward or reverse for propelling the vehicle and human occupant. Likewise, for turning all wheels left or right depending on the position the cyclic was moved by the human operator, i.e, actuating the proper push cylinder (example only) and in the proper direction and amount. The programable controller or computer could respond to electrical inputs for the potentiometers associated with the foot pedals 8 to turn only the rear wheels 3 wherein the operator via selection of the pedal 8 depressed, can command the rear wheels 3 to turn in either direction (left or right angle) and either add or subtract from the angle applied by movement of the cyclic 6. Movement and repositioning of the collective 7 by the operator pulling the lever 7 up or pressing it downward, actuates change in the resistance in the potentiometer connected to or associated with the collective lever 7, the resistance is read by the programable controller or computer wherein the change or new resistance triggers the controller/computer to actuate changes in the operating RPM (revolutions per minute) of the engine/motor of the power plant 4 to increase RPMs with collective down movement or repositioning, and decrease the RPMs with collective up movement or repositioning so as to cause a simulation of load variation much like that of a flying helicopter, a situation with the preferred embodiment wherein the human operator would be required to manipulate the manual throttle control member 9 to compensate or negate those RPM manipulations brought about or in effect called for by his/her moving of the collective 7. Potentiometers are for example only as devices which can feed or provide data indicating movement or a positional change which can be read and acted upon by circuitry and a computer or programable controller, but is for example only as other devices such as optical encoders, strain gages, proximity sensors etc. can be used to sense and or define data related to either force against or movement of the control member, i.e., the joystick 6, the foot pedals 8 and collective 7 and manual throttle 9, the data being useful by a computer or programable controller which is a computer or has computer capabilities. Other devices can also be used including hydraulic or pneumatic valves connected to the input member 6, 7, 8, 9, the valves which are opened or closed more or less depending upon the position of the input member, i.e., cyclic, foot pedals, collective and hand throttle. The pivotally mounted collective 7 in this embodiment, which also includes the hand grip throttle member 9 for manual throttle manipulation, serves as a first throttle manipulator for simulating applied load, and the hand throttle member serves as a second throttle manipulator, at least from one viewpoint.

The cyclic or joystick 6 in the preferred embodiment is a two-axis hand operable joystick mounted in the cockpit to be centered between the operator's legs. Joystick and cyclic are herein basically interchangeable in reference to the preferred embodiment. The use of a joystick provides the operator a feel and functional effect similar to that of a "cyclic" of a flying helicopter. The collective 7 can be mounted to either the left or the right of the human operator. The pedals 8 are mounted in front of the seated operator so that his/her feet can rest thereon. The pedals 8 can be mounted with a central common pivot so that when one pedal moves down the other pedal must move up, or the pedals can be mounted to vehicle to move independently of one another. A biasing to bring both pedals up to a resting position when not under depressive force should be installed and can be resilient spring or gas push cylinders for example. The seated operator can reach the cyclic 6, the pedals 8, collective 7 and the manual throttle 9 (if manual throttle is used) all at the same time.

Figure 2:
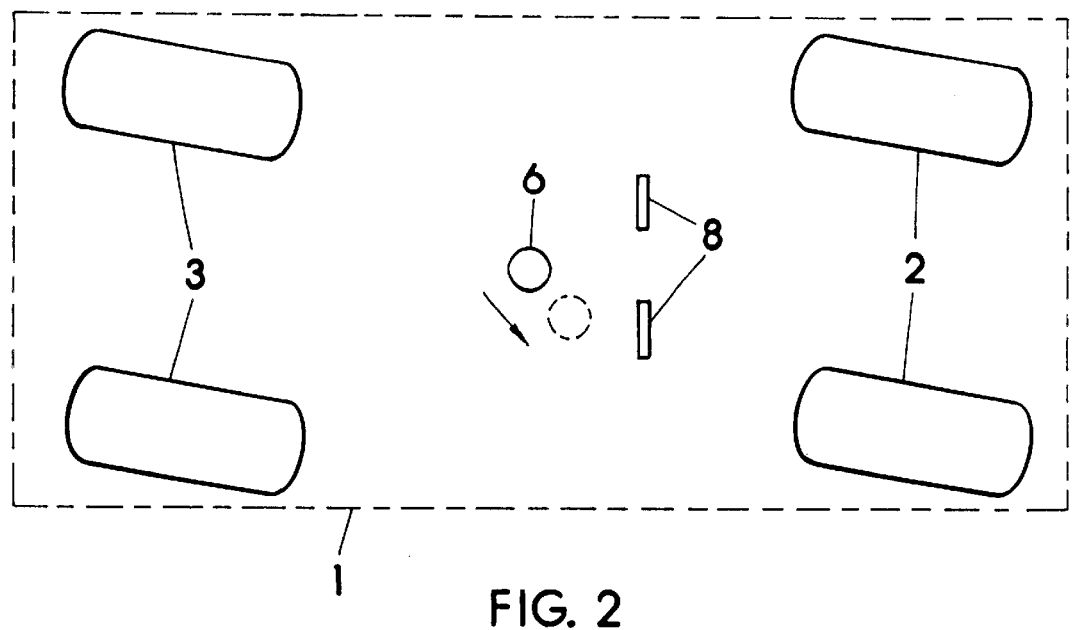
FIG. 2 is a top view, in simplified form, of a portion of the vehicle according to the invention showing the cyclic (joystick) at rest in solid lines, and in broken lines moved forward and to the right to have turned all four shown wheels to the right.

The preferred all-wheel same-direction steering is controlled by the X-axis of the cyclic 6. Two cyclics or joysticks 6 are shown in the FIG. 1 drawing. Drawing FIGS. 2–3 illustrate the preferred four wheel steering controllable by movement of the joystick 6 from the center null position. FIG. 2 is a top view, in simplified form, of a portion of the vehicle according to the invention showing the cyclic (joystick) 6 at rest in solid lines, and the joystick 6 (cyclic) in broken lines moved forward and to the right to have turned or caused the turning of all four wheels 2, 3 to the right.

The frame 1 (frame is herein interchangeable with chassis) is shown in FIGS. 2–8 and is useful as a reference to see the turned angle or steering angle of the wheels 2, 3, and again, in FIGS. 1–8 the nose or front end of the vehicle is nearest the right edge of the drawing.

FIG. 3 is a top view, in simplified form, of a portion of the vehicle according to the invention showing the joystick (cyclic) 6 in solid lines at rest, and in broken lines moved forward and to the left to have turned all four shown wheels 2, 3 to the left. A single double-acting hydraulic push cylinder mounted one portion thereof to the frame 1 and a second portion thereof to a turning (steering turn) portion of one of the front wheels 2 along with the use of a tie-rod between the two front wheels 2 can be used to steer the front wheels 2, and a duplicate arrangement (another push cylinder and tie-rod) can be installed and used at the vehicle back end to steer the back two wheels 3 with the joystick 6. FIG. 9 illustrates for example, using boxes and associating lines, components and associations between the components mainly related to the joystick or cyclic 6 on a vehicle in accordance with the present invention. Shown is the operator's hand input to the joystick, the joystick feeding or providing data, both X and Y axis data, to the on-board computer or programable controller. The computer or programmable controller is shown receiving operating electrical power from the power-plant and its electrical system. The computer processes and feeds Y-axis data to the transmission or valve solenoids which sets drive wheel direction of rotation, i.e. forward or reverse, and dependant upon data from the manual throttle and collective, the drive wheel or wheel(s) drive mechanism is activated to propel the vehicle in a direction forward or reverse) determined by the joystick 6 position in the Y-axis. Speed of travel is determined as a function of the throttle or RPM data. The X-axis data received by the computer or programable controller is processed and used to generate the proper signals (electrical for example) which are sent such as by conductor to electrical controls, which for example in the FIG. 9 can be considered solenoids which are connected to or associated with the valve(s) which are hydraulic fluid flow control valves for example, and which are opened and closed by the solenoids, which as previously mentioned, are controlled by the computer/programable controller responding to the X-axis data from the joystick (cyclic) 6. The hydraulic "valves" can control hydraulic fluid flow and direction from the hydraulic pump system coupled to the power-plant to create pressure in the fluid, the pressurized fluid directed by valves to "actuator(s)" in FIG. 9, which can be the hydraulic push cylinders described above. The speed of the drive wheel(s) is determined by factors including the first and second throttle data inputs to the computer/programable controller which in FIG. 9 are shown as throttle data and collective data into the computer. The pedal data is also shown being provided to the computer/programable controller.

The rear wheel only steering, added on top of the all-wheel steering commands of the cyclic 6, is controlled by the left and right foot pedals 8. The foot pedal 8 are structurally arranged for making the rear wheels 3 steer more than or less than the front wheels 2. See FIGS. 4–8. FIG. 4 is a top view, in simplified form, of a portion of the vehicle according to the invention showing the cyclic (joystick) 6 at rest in a center null or neutral position. Also shown are the two foot pedals 8 in solid lines in front of the cyclic 6. The right foot pedal is illustrated in broken lines as depressed, and the resultant effect is shown as the back or rear wheels 3 steeply turned to the right which if the vehicle were moving would turn the nose or front end to the left. The front wheels 2 are shown aiming straight forward due to the centered or null position of the joystick 6. FIG. 5 shows basically the same as FIG. 4 but with the pedal 8 on the left depressed and the rear wheels 3 turned left which would turn the nose of the moving vehicle to the right. FIG. 6 illustrates the pedal 8 on the left when depressed turning the rear wheels 3 to the left more than the wheels were previously turned to the left by the cyclic or joystick 6, the previous wheel position shown in solid lines and the position brought about by depression of the left foot pedal shown in broken lines and clearly being at a steeper angle than defined by the joystick in controlling all four wheels. The cyclic or joystick is shown moved forward and to the left of center which previously turned all four wheels to the left the same amount. The foot pedal 8 on the left is shown in broken lines depressed, which turned the rear wheels 3, and only the rear wheels 3 further or more to the left. FIG. 7 illustrates the foot pedal 8 on the right when depressed turning the rear wheels 3 to the right more than the wheels were turned to the right by cyclic or joystick 6. The cyclic or joystick 6 is shown moved forward and to the right of center which turned all four wheels to the right by the same amount. The right foot pedal 8 is shown in broken lines depressed, which turned the rear wheels 3 and not the front wheels 2 further or more to the right. FIG. 8 illustrates the left pedal 8 when depressed turning the rear wheels 3 (not the front wheels) to the left when the cyclic (joystick) 6 is moved forward to the right, a situation wherein the proper activated foot pedal 8 subtracts (lessens) the turning amount requested or previously defined by the joystick 6, a situation which also allows the reverse action, although not shown, wherein the joystick 6 could be moved forward to the left of center and only the right foot pedal 8 would be depressed to have the right pedal 8 in essence request and cause the rear wheels 3 turn back somewhat. In FIG. 8, the joystick 6 effected only rear wheels 3 shown in broken lines, and the solid line shown rear wheels 3 indicate the lessening of the angle or bring back of the wheels 3 somewhat by depression of the left foot pedal 8. The or a modern computer or programable controller is very well suited for comparing the X-axis data from the joystick 6 with the data from either of the pedals 8 to set the rear wheel 3 angles via controlling the solenoids of valves operating hydraulic push cylinders or the like (for example only) to that previously programed into the system. Push cylinders or the like can be consider shown or represented by the "ACTUATOR(S)" in FIGS. 9 and 10. FIG. 10 illustrates for example, using boxes and associating lines, components and associations between the components mainly related to the right and left foot pedals 8 on a vehicle in accordance with the present invention. Shown is the operator's right foot and left foot inputs to the corresponding right and left pedals 8, the data from the pedals being fed into the computer or programable controller which is shown also receiving the data pertaining to the joystick, the throttle (manual throttle) and the collective lever. The computer/ programable controller "10" processes the data and actuates electrical controls which as previously described can be electric solenoids which as indicated are associated with actuator(s) which also as previously described is a hydraulic push cylinder for example which extends or retracts in length to pivot the pivotally mounted rear wheels 3 for steering. The same double-acting push cylinder or a single push cylinder can be used, as it can be readily controlled by the joystick 6 and the pedals 8 through use of computer or controller 10 to process the data.

A hydraulic motor, reversible in direction of rotation and variable in speed, can be connected to each wheel 2 and 3 and adjacent frame 1 or suspension member to drive the wheels in order to propel the vehicle. The use of hydraulic motors would be in conjunction with a hydraulic pump connected to be drive by the engine, the power-plant 4 would not then need a typical transmission because the fluid flow could be readily reversed with valves and solenoids. The hydraulic motors should be variable in speed of rotation. The engine speed or RPM is manipulable by a twist grip type hand throttle member 9 located on the collective 7, and also by movement of the collective 7, as pulling up on the collective will slow the operating speed (RPM) of the engine (power-plant) in the preferred embodiment unless the human operator inputs a throttle up signal via manipulating the hand throttle member 9. Basically the collective 7 applies load which can for illustrative purpose be viewed as a vehicle climbing a steep hill wherein unless additional throttle is applied the engine will begin to slow, reducing its RPMs. The hand throttle member 9 can be similar to a motorcycle throttle grip, bi-directionally rotatable, biased such as by a spring to a slower RPM position and rotatable by hand in a direction to apply additional throttle to the power-plant 4 when need. The hand throttle 9 is preferably mounted on the collective lever or arm 7, at its distal end, so that the operator can pull up on the collective 7 to pivot the collective upward in order to release the wheel brakes, wherein the upward movement of the collective results in the potentiometer or the like being read as having a new value by the computer or programable controller which has been previously set to reduce the RPM of the engine (power-plant 4) to simulate additional load that pulling up on a flying helicopter collective would apply. The operator of the present vehicle can in turn (simultaneously) properly respond to the down RPM collective/computer effect by intentionally operating the hand throttle 9 in the direction to add throttle, and maintain the RPM of the power-plant 4. Then with the cyclic 6 moved from the center null position, assuming other obvious factor are properly set, the vehicle will begin to travel in a direction and speed determinable by the human operator.

The wheels brakes shown in FIG. 11 controlled by the collective movement can be cable controlled, electric or through any other suitable arrangement. Preferably collective-down equates to brakes on, collective-up equates to brakes off and RPM down signal from the collective 7. The collective 7 can be located on either side of the seat 5, but for example purposes it is located on the right side in the drawing FIG. 1. FIG. 11 shows the operator hand throttle inputting data into the computer/programable controller which in turn is communicating or effecting the power-plant RPM throttle manipulator which can be the throttle control or a component thereof on the plant-plant (engine) or RPM governor on the engine/motor and capable of raising and lowering the operating RPM of the power-plant. Also shown is the operator hand collective inputting data into the computer/programmable controller which is processing the data and communicating or effecting the power-plant RPM throttle manipulator dependant upon the data, and the RPM setting determined via a comparison of the hand throttle data and the collective data. Joystick data (cyclic) and pedal data are shown feeding into the computer or programable controller. The computer or programable controller processes the data, such as the collective data, and activates and deactivate the wheel brake as previously mentioned, the brake preferably being one with varying degrees of braking capacity (varying friction) dependant upon how far or with what degree of force the collective 7 is pushed downward.

A helicopter flight training vehicle in accordance with the invention can be fitted with numerous accessories or custom modifications to improve utility for a specific duty. For example, some of the accessories include a roof rack, windshield, spare tire, extra gas can, lights, communications radio, 12VDC auxiliary equipment power jack, etc. The present vehicle is a vehicle which can travel a substantial distance, for example several miles to many miles (100 mile for example only) in a day depending on numerous factors. An example of a possible modification is a system whereby the cockpit is mechanically lifted to provide tilt consistent with the cyclic/joystick commands, further simulating helicopter motion.

Although I have very specifically described preferred structures and best mode of the invention for example, it should be understood that many changes in the specific structures and modes described and shown in the drawings can be made without departing from the true scope of the invention.

I claim:

1. A land vehicle capable of transporting a human and useful in helicopter flight training, said vehicle comprising:

a chassis;

a plurality of wheels supporting the chassis;

a power-plant supported by the chassis and operatively connected to means for rotating at least one of the wheels for propelling the vehicle;

at least one seat for supporting at least one human to be transported by the vehicle;

controls mounted on the vehicle and at least in part positioned accessible by a human in the seat for operating the vehicle, said controls comprising:

a hand operable joystick operatively connected to means for controlling left and right steering angles of front wheels and frear wheels of the plurality of wheels responsive to hand inputs to the joystick, the joystick for simulating, at least to a degree, a cyclic control of a helicopter;

a pair of foot operable pedals operatively connected to means for controlling left and right steering angles of the rear wheels of the plurality of wheels responsive to foot inputs to the foot pedals, the foot pedals for simulating, at least to a degree, rear rotor-blade pitch control of a helicopter;

a hand operable collective lever manually movable and operatively connected to means responsive to movement of the collective lever for manipulating operating RPM of said power-plant, whereby various simulated loads resulting in power-plant RPM changes are applied to the power-plant responsive to movement of the collective lever for simulating, at least to a degree, adjustments in main rotor blade pitch of a helicopter;

a hand operable throttle control manually movable and operatively connected to means for manipulating operating RPM of said power-plant, whereby said hand operable throttle control can be used to compensate for RPM manipulations caused by movement of said collective lever.

2. A land vehicle according to claim 1 wherein said hand operable throttle control includes a manually movable member mounted on said collective lever.

3. A land vehicle according to claim 2 wherein said plurality of wheels comprises at least two said front wheels and at least two said rear wheels.

4. A land vehicle useful in helicopter flight training, said vehicle comprising:

a chassis;

a plurality of wheels supporting the chassis;

a power-plant supported by the chassis and operatively connected to rotate at least one of the wheels for propelling the vehicle;

at least one seat for supporting at least one human to be transported by the vehicle;

controls mounted on the vehicle and at least in part positioned accessible by a human in the seat for operating the vehicle, said controls comprising:

a hand operable joystick operatively connected to steer at least a front wheel of the plurality of wheels responsive to hand inputs to the joystick;

foot operable pedals operatively connected to steer at least a rear wheel of the plurality of wheels responsive to foot inputs to the foot pedals;

a hand operable collective lever manually movable and operatively connected to manipulate operating RPM of said power-plant responsive to movement of the collective lever;

a hand operable throttle control manually operable to manipulate operating RPM of said power-plant.

5. A land vehicle useful in helicopter flight training, said vehicle comprising:

a chassis;

a plurality of rotatable members supporting the chassis;

a power-plant supported by the chassis and operatively connected to rotate at least one of the rotatable members for propelling the vehicle;

support means for supporting at least one human to be transported by the vehicle;

a hand operable joystick operatively connected to means responsive to hand inputs to the joystick for steering at least one of the rotatable members;

foot operable pedals operatively connected to means responsive to foot inputs to the foot pedals for steering at least one of the rotatable members;

a hand movable collective lever operatively connected to means responsive to movement of the collective lever for manipulating operating RPM of said power-plant.

6. A land vehicle according to claim 5 further including a hand operable throttle control manually operable separately from said collective lever to manipulate operating RPM of said power-plant.

7. A land vehicle according to claim 6 wherein said rotatable members are wheels.

8. A land vehicle according to claim 7 having at least four said wheels all of which are steered with hand inputs to said joystick.

9. A land vehicle according to claim 8 wherein said support means is a seat.

10. A land vehicle according to claim 9 wherein said seat is a first seat and said vehicle includes a second seat for supporting a second human to be transported.

11. A land vehicle according to claim 10 further including a second joystick, second foot operable pedals, and a second collective lever, whereby dual controls are provided.

12. A land vehicle according to claim 11 wherein pressing downward on either of the collective levers actuates a wheel brake.

* * * * *